United States Patent Office 3,114,748
Patented Dec. 17, 1963

3,114,748
PROCESS FOR THE PREPARATION OF
ω-LACTAMS
Johan A. Bigot, Beek, and Pieter L. Kerkhoffs, Geleen, Netherlands, assignors to Stamicarbon N.V.
No Drawing. Filed Dec. 21, 1961, Ser. No. 161,274
Claims priority, application Netherlands Dec. 23, 1960
10 Claims. (Cl. 260—239.3)

The present invention relates to a novel process for the preparation of ω-lactams.

The preparation of ω-lactams normally starts from cyclic ketones, which are converted into the corresponding oximes, from which the lactams are obtained by rearrangement with sulfuric acid. To prevent the separate preparation of the oximes and the subsequent highly exothermic rearrangement thereof, it has previously been proposed to convert the cyclic ketones directly into the lactams with the aid of hydroxylamine sulphate and sulfuric acid.

According to the present invention, it has now been found that ω-lactams can also be prepared in a direct way by reacting a cycloalkanecarboxylic acid with a nitrosyl compound of the $(NO)_pX$ type where $p$ represents an integer from the range of 1 to 4 and where X represents at least one acid radical in the presence of an electron accepting metal halogenide and/or a metalloid halogenide. This process can be carried out in a simple way by mixing the cycloalkanecarboxylic acid in the liquid phase with the halogenide and adding the nitrosyl compound either simultaneously or afterwards. It is also possible first to mix the nitrosyl compound with the halogenide and then add the mixture to the cycloalkanecarboxylic acid. As a further modification, a compound of the halogenide and the nitrosyl compound may also be used.

It is recommended that an excess of cycloalkanecarboxylic acid be used in practicing the present invention to prevent the occurrence of undesired side-reactions. This excess may be, for example, 25, 50 or 100% with respect to the nitrosyl compound.

Examples of suitable nitrosyl compounds are: nitrosyl nitrite, nitrosyl nitrate, nitrosyl chloride, nitro fluoride, nitrosyl bromide, nitrosyl hydrosulfate, nitrosyl perchlorate, nitrosyl fluorosulfite, nitrosyl hydroselenate, dinitrosyl selenate, dinitrosyl pyrosulfate, and in general any nitrosyl compound in which an acid radical is bound to a nitrosyl group.

As indicated above, the halogenide used herein is an electron-accepting metal halogenide and/or metalloid halogenide. Many halogenides possess this electron-accepting property, for example, aluminum trichloride, antimony trichloride, antimony pentachloride, antimony pentafluoride, auric chloride, auric fluoride, bismuth trichloride, boron trichloride, boron trifluoride, cadmium dibromide, cuprous chloride, ferric chloride, phosphorus pentafluoride, gallium trichloride, germanium tetrafluoride, indium trichloride, lead tetrachloride, manganese dichloride, mercuric chloride, molybdenum tetrabromide, palladium dichloride, platinum trichloride, platinum tetrachloride, selenium tetrafluoride, silicon tetrafluoride, tellurium tetrafluoride, thallium trichloride, tin tetrachloride, tin tetrafluoride, titanium trichloride, titanium tetrachloride, uranium dioxydichloride, vanadium pentafluoride, tungsten pentabromide, zinc dichloride and zirconium tetrabromide. Any of these compounds may be used herein.

It is not necessary to use high or elevated pressures in carrying out the process according to the invention. Thus, the process can be operated in a straight-forward and simple way at atmospheric pressure so that high pressure apparatus is not required. However, by using elevated pressures, for instance, pressures of the order of 5, 15, 30, 50, 100 atm. or even higher, the capacity of the production unit can be increased, particularly if a gaseous halogenide is used.

The temperature to be used may be varied. However, it is recommended that the conditions be such as to maintain a liquid phase, either by initially using a temperature above the melting point of the cycloalkanecarboxylic acid or by using a solvent. It is possible then to work at a temperature of 15° to 150° C. However, it is also possible to use higher temperatures, e.g. 200° to 250° C., in which case it is desirable to work under elevated pressure if a gaseous halogenide is used, particularly if the preferred liquid phase operations are to be realized.

Particularly suitable solvents for use herein are: saturated hydrocarbons, for instance, heptane, octane, cyclohexane, and nitrocompounds or halogen compounds of saturated hydrocarbons, such as nitroethane, nitrohexane and heptyl chloride.

The lactam formed in the present process can be recovered from the reaction product in several ways. One simple procedure comprises separation of the non-converted cycloalkanecarboxylic acid from the reaction product by distillation, and recovery of the lactam from the residue with the aid of solvents, for instance, with benzene or chloroform, after decomposition of any complexes formed. In most cases water can be used as a solvent.

According to another recovery procedure, the distillation may be omitted and the lactam is directly extracted with the aid of solvents.

In a further modification involving the use of ammonia, it is possible in most cases to form a complex compound of the halogenide and ammonia. With this modification, it is preferred when boron trifluoride is used as halogenide, to recover the boron trifluoride from the reaction product by introducing gaseous ammonia into the reaction product and separating and decomposing the solid ammonia-boron trifluoride complex formed.

The invention is illustrated, but not limited, by the following examples:

*Example I*

Into a spherical reaction vessel having a capacity of 1 litre and provided with a stirrer, boron trifluoride was introduced into 256 g. of cyclohexanecarboxylic acid at a temperature of 35° to 65° C. until a mist escaped from the vessel. Thereafter 92 g. of nitrosyl chloride were gradually introduced into the reaction vessel over the course of 45 minutes and the mixture was then stirred for one more hour at a temperature of 135° to 140° C.

The reaction mixture was then distributed in 0.5 litre of water after which the resulting oil phase was separated from the aqueous phase. The aqueous phase was neutralized with sodium hydroxide, and the caprolactam extracted from it with the aid of chloroform. The output was 23.5 g. of ε-caprolactam corresponding to a yield of 58% with respect to the cyclohexanecarboxylic acid converted.

Extraction of the oil phase yielded 226 g. of cyclohexanecarboxylic acid (content 93%), which could be used again in the reaction.

*Example II*

Into a cylindrical reaction vessel having a capacity of 0.5 litre and provided with a stirrer, there was placed 75 g. of molten cyclohexanecarboxylic acid. Boron trifluoride was introduced into this vessel at a temperature of 40° to 55° C. until a mist escaped from the vessel. After that, 38 g. of nitrosyl nitrite-boron trifluoride compound were added batchwise in 40 minutes. During this addition the temperature was gradually increased to 125 to 135° C., after which the mixture was stirred at that temperature for one more hour.

The reaction product was processed in the same way as described in Example 1 to give 66 g. of non-converted cyclohexanecarboxylic acid (content 95%) and 6 g. of ε-caprolactam. This corresponds to a yield of 54% with respect to the carboxylic acid converted.

*Example III*

130 g. of cyclohexanecarboxylic acid were placed in a spherical reaction vessel having a capacity of 1 litre and provided with a stirrer. Boron trifluoride was introduced at a temperature of 40° to 55° C. until a mist escaped from the reaction vessel. After that, 250 ml. of pure n-heptane were added and 60 g. of nitrosyl chloride were introduced slowly at room temperature (20°–25° C). The mixture was then heated at 55° C. for several hours and finally at 98° C. for 2 hours.

The reaction mixture consisting of two layers was then separated. The heptane layer yielded 45 g. of cyclohexanecarboxylic acid (content 93%). The heavier layer was absorbed in benzene, after which ammonia was introduced. From the resulting ammonia-boron trifluoride complex, which was separated by centrifuging, the boron trifluoride was regenerated, for instance, by treatment with mineral acid. The filtrate was evaporated and the residue was taken up in dilute sodium carbonate. The resulting solution was extracted with chloroform and then acidified and extracted with benzene. The chloroform extract yielded 34 g. of caprolactam. This is 55% calculated to the amount of converted cyclohexanecarboxylic acid. In addition, the benzene extract yielded 20 g. of cyclohexanecarboxylic acid.

*Example IV*

135 g. of cyclohexanecarboxylic acid were placed in the spherical reaction vessel of the previous examples. Boron trifluoride was introduced at a temperature of 40° to 55° C. After that, 60 g. of nitrosyl chloride were slowly introduced at 40° C., a stream of boron trifluoride being passed through at the same time. Thereupon, 250 ml. of nitroethane were added and heated at 100° to 110° C. for one hour. After cooling, the solution was extracted with water. 77 g. of cyclohexanecarboxylic acid were recovered from the resulting nitroethane layer by distillation. The aqueous layer was neutralized and 33 g. of caprolactam were extracted with the aid of chloroform. This corresponds to a yield of 64% with respect to the amount of converted cyclohexanecarboxylic acid.

*Example V*

130 g. of cyclohexanecarboxylic acid were placed in the spherical reaction vessel used in the preceding examples. Boron trifluoride was introduced into the reaction vessel at a temperature of 30° C. At the same temperature, 200 ml. of n-heptane were added and 60 g. of nitrosyl chloride were slowly introduced. The temperature was then increased and at approximately 75° C. a rapid decarboxylation set in. Upon termination of this decarboxylation, the reaction mixture was heated at 98° C. for half an hour and the n-heptane was removed by distillation under reduced pressure. Boron trifluoride and non-converted cyclohexanecarboxylic acid were then removed from the residue by distillation under decreased pressure. 76 g. of cyclohexanecarboxylic acid (content 88%) were recovered.

The distillation residue was taken up in benzene and gaseous ammonia was led into the solution. The resulting ammonia-boron trifluoride complex was drawn off, the filtrate was washed with saturated sodium bicarbonate solution, the sodium bicarbonate layer extracted two times with chloroform and the whole body of organic layers evaporated. 45 g. of caprolactam were obtained. This is equivalent to a yield of 82% calculated to the amount of cyclohexanecarboxylic acid converted.

*Example VI*

A reaction vessel having a capacity of 200 ml. and provided with a stirrer was charged with 30 g. of cycloheptanecarboxylic acid. Boron trifluoride was introduced at a temperautre of 40° to 55° C. until a mist escaped from the reaction vessel. After that, 65 ml. of iso-octane were added, and 15 g. of nitrosyl chloride were slowly introduced at room temperature (20°–25° C.). The mixture was then heated for 2 hours at 55° C. and for another 2 hours at 116° C.

The reaction mixture was processed in the way described in Example 3. By using this procedure 17 g. of cycloheptanecarboxylic acid were recovered while 6.5 g. of oenantholactam, corresponding to a yield of 56% calculated to the amount of cycloheptanecarboxylic acid converted, were obtained.

It will be appreciated that various modifications may be made in the invention described herein without deviating from the scope thereof. Thus, for example, while the invention is illustrated using cycloheptanecarboxylic acid or cyclohexanecarboxylic acid, other representatives of the cycloalkanecarboxylic acids series up to cyclododecanecarboxylic acid may also be used. Typically, the alkane group may comprise from 5 to 12 carbon atoms, the methylcyclopentane group and the methylcyclohexane group included.

The scope of the invention is defined in the following claims wherein we claim:

1. A process for preparing an ω-lactam which comprises reacting a cycloalkanecarboxylic acid with a nitrosyl compound of the $(NO)_pX$ type where $p$ represents an integer from the range of 1 to 4 and where $X$ represents at least one acid radical in the presence of an electron-accepting halogenide selected from the group consisting of electron-accepting metal halogenides and metalloid halogenides, the alkane group of said cycloalkanecarboxylic acid having from 5 to 12 carbon atoms.

2. The process of claim 1 wherein the nonconverted cycloalkanecarboxylic acid is separated from the reaction product by distillation and the lactam is recovered from the residue using a solvent.

3. The process of claim 1 wherein boron trifluoride is used as the electron-accepting halogenide and said trifluoride is recovered from the reaction product by introducing gaseous ammonia into the reaction product followed by separating and decomposing the resulting solid ammonia-boron trifluoride complex.

4. The process of claim 1 wherein said acid is cyclohexanecarboxylic acid.

5. The process of claim 1 wherein said acid is cycloheptanecarboxylic acid.

6. The product of claim 1 wherein said nitrosyl compound is nitrosyl chloride.

7. The process of claim 1 wherein an excess of said acid is used based on the amount of said nitrosyl compound.

8. The process of claim 1 wherein said reaction is carried out in the liquid phase.

9. The process of claim 8 wherein the reaction temperature is between 15° and 250° C.

10. The process of claim 8 wherein the reaction is carried out in the presence of an inert saturated hydrocarbon solvent.

References Cited in the file of this patent

UNITED STATES PATENTS 3,022,291     Muench et al. _____ Feb. 20, 1962

FOREIGN PATENTS 52,901 of 1959     Australia _____ Mar. 24, 1960

52,908 of 1959     Australia _____ Mar. 24, 1960

58,823 of 1960     Australia _____ Sept. 29, 1960

1,238,981     France _____ July 11, 1960

OTHER REFERENCES

Moeller: "Inorganic Chemistry," pp. 309–321, 326–29 (Wiley) (1952).